C. F. HOWELL.
FREEZER.
APPLICATION FILED JULY 29, 1918.

1,376,016.

Patented Apr. 26, 1921.
2 SHEETS—SHEET 1.

Witnesses:

Inventor
Claude F. Howell

C. F. HOWELL.
FREEZER.
APPLICATION FILED JULY 29, 1918.

1,376,016.

Patented Apr. 26, 1921.
2 SHEETS—SHEET 2.

Witnesses:
Inventor
Claude F. Howell
by Clarence E. Mehlhope Atty.

UNITED STATES PATENT OFFICE.

CLAUDE F. HOWELL, OF CHICAGO, ILLINOIS, ASSIGNOR, BY MESNE ASSIGNMENTS, TO CONTINENTAL MACHINERY COMPANY, A CORPORATION OF DELAWARE.

FREEZER.

1,376,016.

Specification of Letters Patent.

Patented Apr. 26, 1921.

Application filed July 29, 1918. Serial No. 247,144.

*To all whom it may concern:*

Be it known that I, CLAUDE F. HOWELL, a citizen of the United States, and a resident of Chicago, Cook county, Illinois, have invented certain new and useful Improvements in Freezers; and I do hereby declare that the following is a full, clear, and exact description thereof, reference being had to the accompanying drawings and to the letters of reference marked thereon, which form a part of this specification.

This invention relates to improvements in freezers for ice cream and the like and consists of the matters hereinafter described and more particularly pointed out in the appended claims.

The object of the invention is to produce an efficient, large capacity freezer such as is used in ice cream factories, for the preliminary mixing, swelling and freezing of the cream mixture or the like, wherein the freezer is constructed to provide a jacket space closely adjacent and surrounding the mixing and freezing chamber thereof, which jacket space may be connected to the expansion and return lines of a refrigerating apparatus, so that a circulation of the refrigerant and a direct expansion thereof may be had through said jacket space about the mixing and freezing chamber.

A further object of the invention is to construct the freezer so that the circulation of the refrigerant may be controlled through said jacket space and may be entirely cut off therefrom so that in the case of a battery or a set of such freezers, one individual freezer may be cut out of the refrigerating system without affecting the other freezers in that particular battery or set.

Further objects of the invention are to provide suitable means for draining said jacket space when desired and to so construct the freezer as to insure against a leakage of the refrigerant being used, either into the mixing chamber or into the surrounding atmosphere.

In the drawings:—

Figure 1:
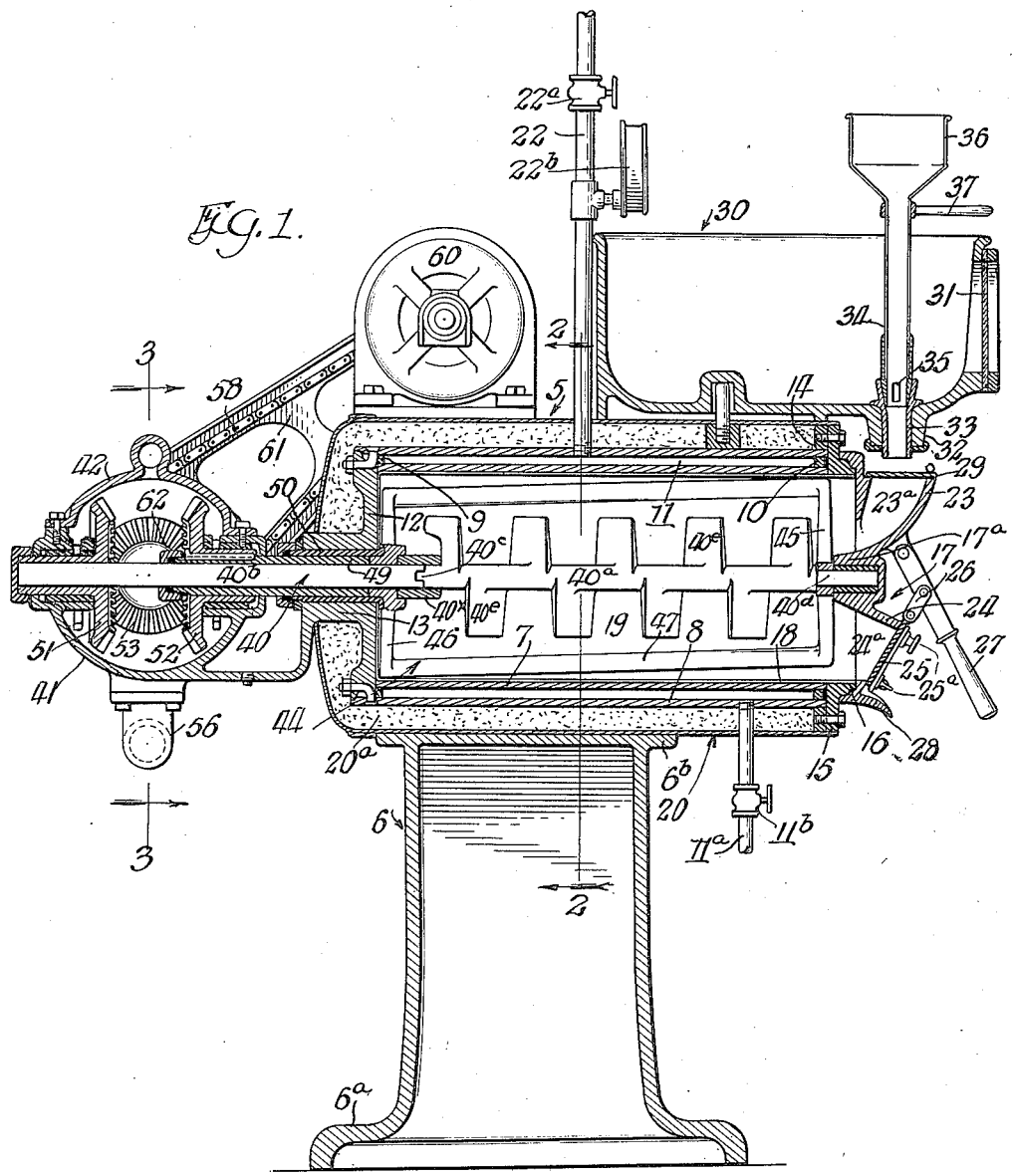
Figure 1 illustrates a longitudinal, vertical sectional view through a freezer embodying my invention.

Referring now to that embodiment of the invention illustrated in the accompanying drawings:—5 indicates as a whole, a substantially horizontal, insulated and jacketed cylinder which rests and is supported upon the top end of an upright hollow column 6. Preferably the front end of said cylinder overhangs said column to a greater extent than the rear end of the cylinder, as shown. The bottom end of said column 6 has an outwardly extending, floor flange $6^a$ which provides a base of substantially large area while the top end of said column has a transversely extending, semi-cylindric flange $6^b$ forming a seat for said cylinder.

The cylinder 5, which is slightly inclined to the horizontal, downwardly toward its front end, includes a pair of concentrically arranged, inner and outer, tubular members 7 and 8 which are held in spaced relation by end rings 9 and 10. Said members, together with said rings, define a jacket space 11 which is adapted to receive and have circulated through it, a refrigerant in a manner soon to appear. The rear ends of said tubular members 7 and 8 are closed by and are secured in a suitable manner, to a head plate 12 that has a rearwardly extending hub 13 of a substantial diameter. The front end of the outer tubular member 8 has secured to it, a radially arranged, spacing ring 14 and to the front face of said ring is fixed a second ring 15 that has an annular flange 16 providing a seat for a removably attached, front head plate 17. Within the tubular member 7 and extending from the rear head plate to the front edge of the flanged ring 15 is a lining 18 of non-rustable metal which is attached in place without seams, in any suitable manner. This lining, together with the front head plate 17, defines a mixing and freezing chamber 19. A thin metallic, outer shell 20, which is fixed at its front end to the peripheries of the rings 14 and 15, incloses the tubular members 7 and 8 and the rear head plate 12, said shell having a suitable rear end wall through which the hub 13 of the head plate 12 extends. The space between the said shell 20 and the outer, tubular member 8 and head plate 12, is packed with a suitable heat insulation material 20ª, such as cork.

Figure 2:
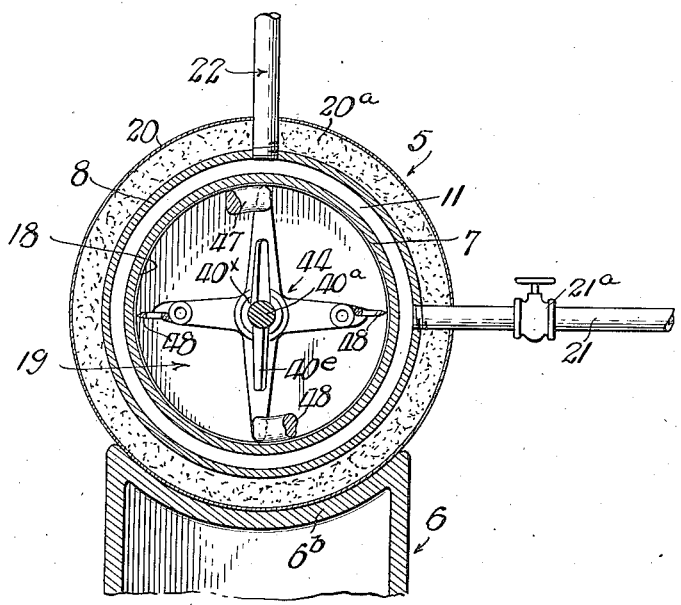
Fig. 2 illustrates a transverse, vertical sectional view through the same on a slightly enlarged scale, the plane of the section being indicated by the line 2—2 of Fig. 1.

Connected to the jacket space 11, at its middle on one side (see Fig. 2) is a pipe 21 in which is provided a shut-off valve 21ª and leading off from said jacket space 11 at its top is a second pipe 22 in which is provided a shut-off valve 22ª and a pressure gage 22ᵇ. The pipe 21 is the inlet for a refrigerant to the jacket space 11, and is adapted to be connected up with the liquid receiver of a refrigerating apparatus, while the pipe 22 is the outlet for the refrigerant from the jacket space 11 and is adapted to be connected up with the suction side of the refrigerating apparatus. By connecting up the pipes 21 and 22 as just described, a circulation of refrigerant may be established through and about the jacket space, and this circulation may be controlled by means of the valves 21ª and 22ª. A pipe 11ª having a valve 11ᵇ, is connected to the jacket space 11 at its front bottom end for the purpose of draining said jacket space when so desired.

The front head plate 17 comprises an integral casting, formed coaxially of the cylinder 5 to provide an inwardly extending bearing sleeve 17ª, and above and below said sleeve are hollow bosses 23 and 24 which define an upwardly opening inlet 23ª and a forwardly opening discharge 24ª respectively, into and from the mixing and freezing chamber 19. The discharge opening 24ª is closed by a sliding door 25 that is connected by a link 26 with an operating lever 27 that is pivoted at one end to the hollow boss 23. Butterfly nuts 25ª are provided to seal the door in its closed position and the head plate 17 is formed with a lip 28 just below the discharge opening 24ª which provides a suitable spout. The inlet opening 23ª is closed by a horizontally swinging door 29.

Mounted on top of and securely affixed to the cylinder 5, in front of the pipe 22 and overhanging the front head plate 17, is a hopper 30. This hopper which is in the form of an open top, integral, substantially rectangular container for the reception of the materials to be mixed and frozen, has a sight glass 31 at its front end through which the height of said materials may be observed. Said hopper has a depending, annular flange 32 at its front end, in which is located a tubular sleeve 33 that defines a discharge opening in vertical alinement with the inlet opening 23ª in the head plate 17. The top end of the tubular sleeve 33 is tapered upwardly and outwardly to form a valve seat for a tubular, elongated valve 34, there being a suitable hole 35 in said valve 34 which is adapted to register with a like hole in the top end of the sleeve 33. At the top end of said tubular valve is provided an auxiliary hopper 36 for the reception of semi-solids such as crushed fruits which it may be desired to admit into the mixing and freezing chamber 19. A handle 37 is fixed to the tubular valve 34 just below the hopper 36 for the purpose of rotating the valve 34 to bring the hole 35 in said valve into and out of register with the like hole in the sleeve 33.

40 indicates as a whole, an agitator shaft which is arranged coaxially of the cylinder 5. Said shaft comprises two sections 40ª and 40ᵇ which are rotatively connected together by a tongue and groove connection 40ᶜ, and this tongue and groove connection is surrounded by a collar 40ˣ. The shaft section 40ª is located within the chamber 19, and has a front end 40ᵈ of reduced diameter which bears in the sleeve 17ª on the front head plate 17 and also has a plurality of longitudinally spaced, spiral agitator or beater blades 40ᵉ throughout its length. The other shaft section 40ᵇ extends rearwardly from the cylinder 5 and is suitably journaled in an open top, hemispherical, gear case 41 made integral with and extending rearwardly from the hub 13 of the rear head plate 12. The open top of the gear box 41 is closed by a hemispherical cap 42.

44 indicates as a whole, a mixer and scraper within the chamber 19. Said mixer and scraper includes front and rear spiders 45 and 46 which have radial arms that are arranged in pairs extending at about 90° to each other and the associated arms of the front and rear spiders are connected by spiral mixing blades 47 and longitudinally arranged scraper blades 48 all of which approximately engage the lining 18 (see Fig. 2).

The front spider has a hub that is rotatively mounted on that part of the reduced end 40ᶜ of the shaft section 40ª adjacent the bearing sleeve 17ª, while the rear spider has a hub that has a detachable connection with a sleeve 39 surrounding the shaft section 40ᵇ. Said sleeve 49 in itself has bearing in a journal sleeve 50 suitably fixed in the hub 13 of the rear head plate 12.

Figure 3:
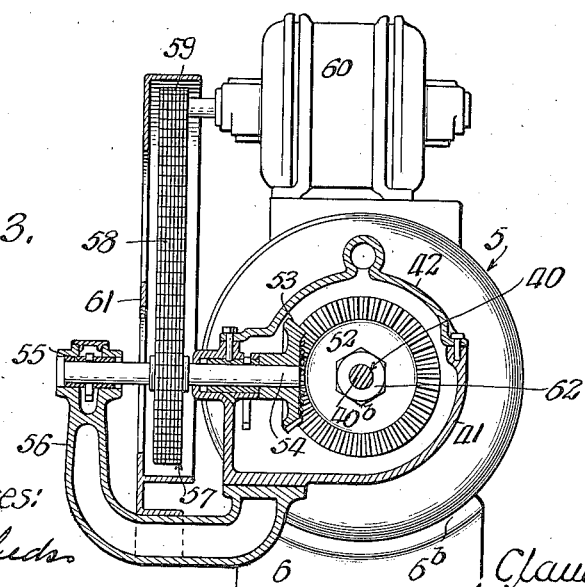
Fig. 3 illustrates another transverse, vertical sectional view through the same, the plane of the section being indicated by the line 3—3 of Fig. 1.

Fixed to the rear ends of the shaft part 40ᵇ and the sleeve 49 respectively, are oppositely facing bevel gears 51, 52, which are driven in opposite directions by a bevel gear 53 fixed on a laterally extending shaft 54 that is journaled at one end in a side wall of the gear case and at its other end in a bearing sleeve 55 made integral with the top end of an L-shaped hollow arm 56 secured to the bottom of said gear case (see Fig. 3). A sprocket 57, fixed on the shaft 54 is driven by a silent chain 58 from a smaller sprocket 59 on the armature shaft of a motor 60, mounted on a suitable base on the top rear end of the cylinder 5. A suitable guard 61 incloses and protects the chain 58. Suitable journal sleeves are provided in the bearings for the shaft section 40$^b$ and the shaft 54, as well as suitable oil feeding rings, and there is a stuffing box 62 associated with the rear end of the sleeve so that no oil can work its way along the shaft section 40$^b$ into the mixing and freezing chamber 19.

The operation of my improved mixing and freezing machine is as follows. Assuming that the tubular valve 34 has been rotated to a closed position and a proper amount of the cream mixture has been placed in the container 30. The electric motor is then started and operates to drive the shaft 54 which in turn will drive the gears 51 and 52 and their shaft and sleeve 40$^b$ and 49 respectively, in opposite directions. The shaft section 40$^a$ will then rotate in one direction and the scraping and mixing blades will rotate in the opposite direction. The valves 21$^a$ and 22$^a$ in the pipe lines 21 and 22 respectively, which are connected up to the refrigerating apparatus as before described, are opened to establish a circulation of the refrigerant through the jacket space 11.

The door closure 29 for the inlet to the chamber 19, is now opened, the door 25 being kept closed. The handle 37 is next operated to bring the hole 35 in the valve 34 into registering position with the like hole in the sleeve 33. The mixture in the container will then flow through the sleeve 33 to be discharged into the inlet opening 23$^a$ in the hollow boss 23, which will direct the mixture into the mixing chamber 19.

With the shaft section 40$^a$ rotating in one direction and the scraper and mixer 44 rotating in the opposite direction, the mixture now within the compartment 19 will be churned and at the same time will be frozen to the desired consistency, which is a semi-fluid state. During the agitation or churning in the chamber 19, the material will swell and be cooled to the proper degree.

The butterfly nuts 25$^a$ are now loosened and the lever 27 is actuated to open the door 25 when the swelled, frozen mixture will flow out through the opening 24 by reason of the inclination of the cylinder and will be directed into a can provided therefor beneath the spout 28. This can which receives the partially frozen and mixed material, is then placed in a suitable container to be frozen to the desired, substantially hard consistency.

Should it be desired to introduce a crushed fruit or the like into the mixing and freezing chamber 19, to be mixed and frozen with the other material already in said chamber, such quantity of crushed fruit may be placed in the auxiliary hopper 36 on the top end of the tubular valve 34 to flow down the said valve through the sleeve 33 and into the inlet opening 23$^a$ leading into the mixing and freezing chamber. Thus, the material in said chamber 19, together with the crushed fruit, will be thoroughly mixed as they are being frozen. In this manner, the semi-solids such as crushed fruit need not be placed in the container 30 and therefore there is no danger of the fruit curdling the cream mixture before it has been thoroughly mixed and frozen to the proper consistency.

When it is desired to clean out the compartment 19, the head plate 17 may be removed from the flanged ring 16 and the shaft section 40$^a$ together with the mixer and scraper 44 may be withdrawn through the open end of the cylinder 5 to permit of thorough cleaning of the chamber 19 and also the said agitator shaft section and said mixer and scraper blades.

The container 30 may be washed or flushed out and the tubular valve 34 removed from the sleeve 33 for the purpose of a thorough cleaning of said container. After the parts have been thus cleaned, the valve 34 is again replaced in the tubular sleeve 33, the shaft sections 40$^a$ and the scraper and mixer blades replaced, after which the header 17 is secured to the flanged ring 16. When it is desired to drain the jacket space 11, this may be done through the pipe 11$^a$ and its valve 11$^b$.

My improved freezing machine has many advantages. A refrigerating medium is circulated through the jacket space 11, as has been described, to readily and quickly cool the interior chamber 19. By the piping arrangement shown and described, any one mixer and freezer of a battery or set, may be cut out of said battery or set without disturbing the operation of the others or of the refrigerating apparatus, to which they are connected.

The freezer is so constructed as to be easily taken apart for the purpose of cleaning, and it is therefore sanitary. Crushed fruits or other solids or semi-solids may be introduced into the mixing and freezing chamber without impairing the cream mixture.

While in describing my invention, I have referred to certain details of construction and arrangement of parts, it is to be understood that the invention is in no way limited thereto, except as may be pointed out in the appended claims.

I claim as my invention:

1. A freezer comprising a pair of concentrically arranged, spaced, tubular members, rings between the ends of said members for holding them in spaced relation, said tubular members and rings providing a jacket space, a rear head plate including a hub, a front ring plate, the rear end of said inner tubular member engaging the face of said rear head plate and the rear end of the outer tubular member overlapping and being secured to the periphery of said rear head plate, the front ends of both of said tubular members engaging the face of said front ring plate, a front head plate secured to said ring plate and defining with said rear head plate and tubular members, a freezing chamber, the front head plate having inlet and outlet openings for said freezing chamber, an agitating means in said freezing chamber, journaled in said hub and in said front head plate, respectively, and means for connecting said jacket space with the supply and return line of a liquid refrigerant supply.

2. A freezer comprising a pair of concentrically arranged, spaced, tubular members, rings between the ends of said members for holding them in spaced relation, said tubular members and rings providing a jacket space, a rear head plate including a hub, a front ring plate, the rear end of said inner tubular member engaging the face of said rear head plate and the rear end of the outer tubular member overlapping and being secured to the periphery of said rear head plate, the front ends of both of said tubular members engaging the face of said front ring plate, a front head plate secured to said ring plate and defining with said rear head plate and tubular members, a freezing chamber, a seamless sheet metal lining for said chamber, the front plate having inlet and outlet openings for said mixing chamber, an agitating means in said freezing chamber, journaled in said hub, and in said front head plate respectively, and means for connecting the jacket space with the supply and return line of a liquid refrigerant supply.

3. A freezer comprising a pair of concentrically arranged, spaced, tubular members, means for holding said members in spaced relation to provide a jacket space, a rear head plate including a hub, a front ring plate including an annular and a radial flange, the ends of said tubular members engaging said rear head plate and said front ring plate respectively, a front head plate having an inlet and an outlet opening, said tubular members and front and rear head plates defining a mixing chamber, agitating means in said chamber, journaled in the hub of said rear head plate and said front head plate respectively, an outer shell spaced from and inclosing said rear head plate and said tubular members, said shell being fixed to the hub of said rear head plate and the annular flange of said front ring plate, insulation between said shell and said rear head plate and tubular members, and means connecting the jacket space with the supply and return line of a refrigerating apparatus.

In testimony, that I claim the foregoing as my invention, I affix my signature in the presence of two witnesses, this 1st day of June, A. D. 1918.

CLAUDE F. HOWELL.

Witnesses:
D. M. CAMERON,
W. B. LATHROP.